(12) United States Patent
Hopkins et al.

(10) Patent No.: US 7,578,344 B2
(45) Date of Patent: Aug. 25, 2009

(54) UNSINTERED MESH SAND CONTROL SCREEN

(75) Inventors: Sam A. Hopkins, Belews Creek, NC (US); Brady S. Alt, Greensboro, NC (US)

(73) Assignee: Purolator Facet, Inc., Greensboro, NC (US)

( * ) Notice: Subject to any disclaimer, the term of this patent is extended or adjusted under 35 U.S.C. 154(b) by 7 days.

(21) Appl. No.: 11/298,950

(22) Filed: Dec. 9, 2005

(65) Prior Publication Data

US 2006/0157256 A1 Jul. 20, 2006

Related U.S. Application Data

(60) Provisional application No. 60/635,246, filed on Dec. 9, 2004.

(51) Int. Cl.
E21B 43/08 (2006.01)
(52) U.S. Cl. ........................ 166/230; 166/236
(58) Field of Classification Search ............... 166/278, 166/228, 230, 236
See application file for complete search history.

(56) References Cited

U.S. PATENT DOCUMENTS

| | | | | |
|---|---|---|---|---|
| 3,344,923 | A | * 10/1967 | Silverwater et al. | ............ 210/90 |
| 4,416,331 | A | 11/1983 | Lilly | |
| 4,428,431 | A | 1/1984 | Landry et al. | |
| 5,411,084 | A | * 5/1995 | Padden | ........................ 166/230 |
| 5,611,399 | A | * 3/1997 | Richard et al. | ............... 166/230 |
| 5,624,560 | A | 4/1997 | Voll et al. | |
| 5,782,299 | A | 7/1998 | Simone et al. | |
| 5,937,944 | A | 8/1999 | Simone et al. | |
| 6,109,349 | A | 8/2000 | Simone et al. | |
| 6,305,468 | B1 | 10/2001 | Broome et al. | |
| 6,415,509 | B1 | * 7/2002 | Echols et al. | ............. 29/896.62 |
| 6,457,518 | B1 | 10/2002 | Castano-Mears et al. | |
| 6,514,408 | B1 | 2/2003 | Simone | |
| 6,668,920 | B2 | 12/2003 | Setterberg, Jr. | |
| 6,704,988 | B2 | 3/2004 | Kenney et al. | |
| 6,715,544 | B2 | 4/2004 | Gillespie et al. | |
| 6,799,686 | B2 | 10/2004 | Echols et al. | |
| 2006/0137883 | A1 | * 6/2006 | Kluger et al. | ................ 166/380 |

OTHER PUBLICATIONS http://www.wipo.int/pctdb/en/jsp?IA=GB1999001750&DISPLAY=DESC.*
http://www.nutechservices.com/mki//PDFs/Sintered%20Wire%20Mesh.pdf.*
(http://www.engineersedge.com/welding.htm.*
"PoroPlus! extended-area sand-control screens"; Purolator Products Company, Facet Filter Products Division; 1997; 6 pages.

* cited by examiner

Primary Examiner—David J Bagnell
Assistant Examiner—Sean D Andrish
(74) Attorney, Agent, or Firm—Reinhart Boerner Van Deuren P.C.

(57) ABSTRACT

A particle control screen assembly for a perforated pipe used in a well. The particle control screen assembly includes a screen with a first end and a second end. The screen includes a first and a second unsintered woven mesh layer, each layer having a first longitudinal edge and a second longitudinal edge. The cylindrical screen also includes openings sized to prevent passage of particulate material and a longitudinal metal weld adjacent the first and second longitudinal edges of the first and second unsintered woven mesh layers. The longitudinal metal weld secures the edges of the unsintered woven mesh layers together. The particle control screen assembly also includes a weld-compatible metal structure adjacent the first end of the cylindrical screen. A circumferential metal weld between the cylindrical screen and the metal structure bonds a portion of the metal structure and a portion of the cylindrical screen.

23 Claims, 5 Drawing Sheets

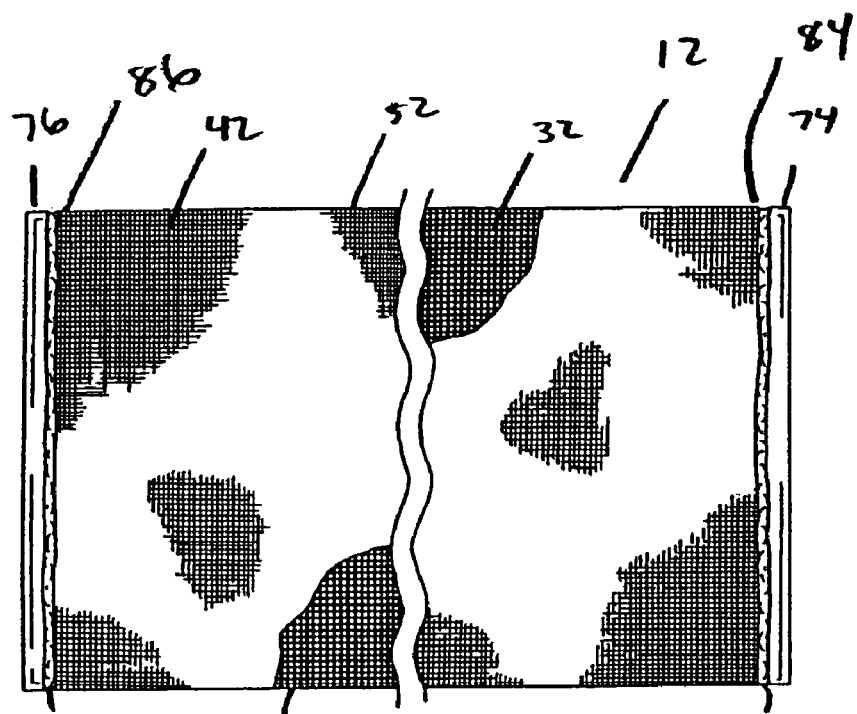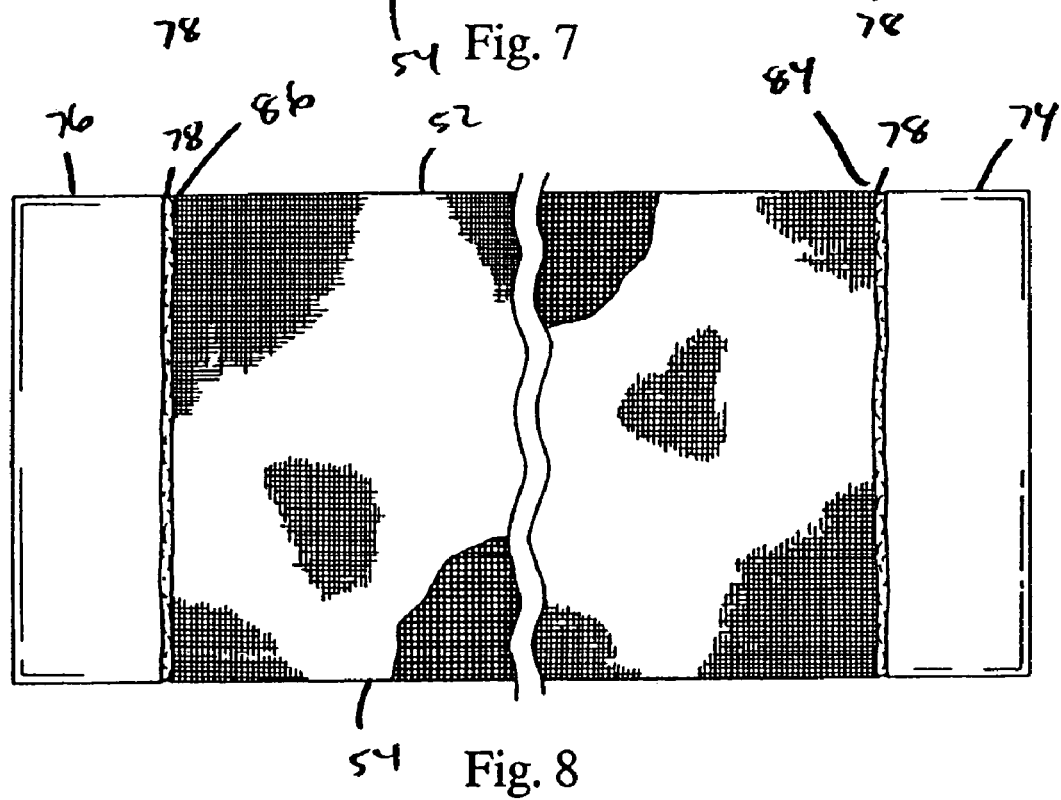

UNSINTERED MESH SAND CONTROL SCREEN

RELATED APPLICATIONS

This application claims the benefit of U.S. Provisional Patent Application No. 60/635,246, filed Dec. 9, 2004, the entire disclosure of which is hereby incorporated herein by reference

BACKGROUND

Particle control screen assemblies have been used for perforated pipes used in a well. The particle control screen assembly typically includes at least one outer cylindrical perforated plate and at least one inner fine mesh control screen contained therein. For example, arrangements of particle control screen assemblies for a perforated pipe used in a well are disclosed in U.S. Pat. Nos. 5,782,299, 5,899,271, and 5,937,944, all to Simone et al., and commonly owned by the present assignee of the instant patent application.

In this field, it is desirable to minimize leakage of sand or other particulate into the perforated pipe. There are several sand control products that use an unsintered/non-diffusion bonded mesh layer for the filter medium and subsequent drainage layers. However, existing unsintered/non-diffusion bonded mesh layer products typically include a longitudinal seam joint that is created by folding or crimping. This longitudinal seam joint creates a leak path between the folds. This leak path is particularly prevalent when fluid is pumped into the well by pumping fluid down the well and into the formation. To prevent the formation of a leak path, welded seams have been used with sand control product made from diffusion bonded mesh. However, this product is extremely expensive to manufacture.

BRIEF SUMMARY

In one aspect, a particle control screen assembly for a perforated pipe used in a well is provided. The particle control screen assembly includes a screen with a first end and a second end. The screen includes a first and a second unsintered woven mesh layer, each layer having a first longitudinal edge and a second longitudinal edge. The cylindrical screen includes openings sized to prevent passage of particulate material and a longitudinal metal weld adjacent the first and second longitudinal edges of the first and second unsintered woven mesh layers. The longitudinal metal weld secures the edges of the unsintered woven mesh layers together. The particle control screen assembly also includes a weld-compatible metal structure adjacent the first end of the cylindrical screen. A circumferential metal weld between the cylindrical screen and the metal structure bonds a portion of the metal structure and a portion of the cylindrical screen.

In another aspect, a method of producing a particle control screen assembly for a perforated pipe used in a well is provided. A first and second mesh layer are provided. The first and second mesh layers are connected together such that they form a two-layer unsintered screen with first and second ends and first and second longitudinal edges. A solid metal strip is attached to the first end of the two-layered unsintered screen. The two-layered unsintered screen is formed into a generally cylindrical shape, with each mesh layer having a first and second longitudinal edge and with the solid metal strip disposed at one end. The first and second longitudinal edges of at least one of the mesh screens are trimmed so that the longitudinal edges are generally coterminous. The first and second longitudinal edges of the mesh layers are then welded together.

The foregoing paragraphs have been provided by way of general introduction, and are not intended to limit the scope of the following claims.

BRIEF DESCRIPTION OF THE DRAWINGS

FIG. 7 shows an embodiment of woven mesh layers with metal structures on the ends.

FIG. 8 shows another embodiment of woven mesh layers with metal structures on the ends.

DETAILED DESCRIPTION

Figure 1:
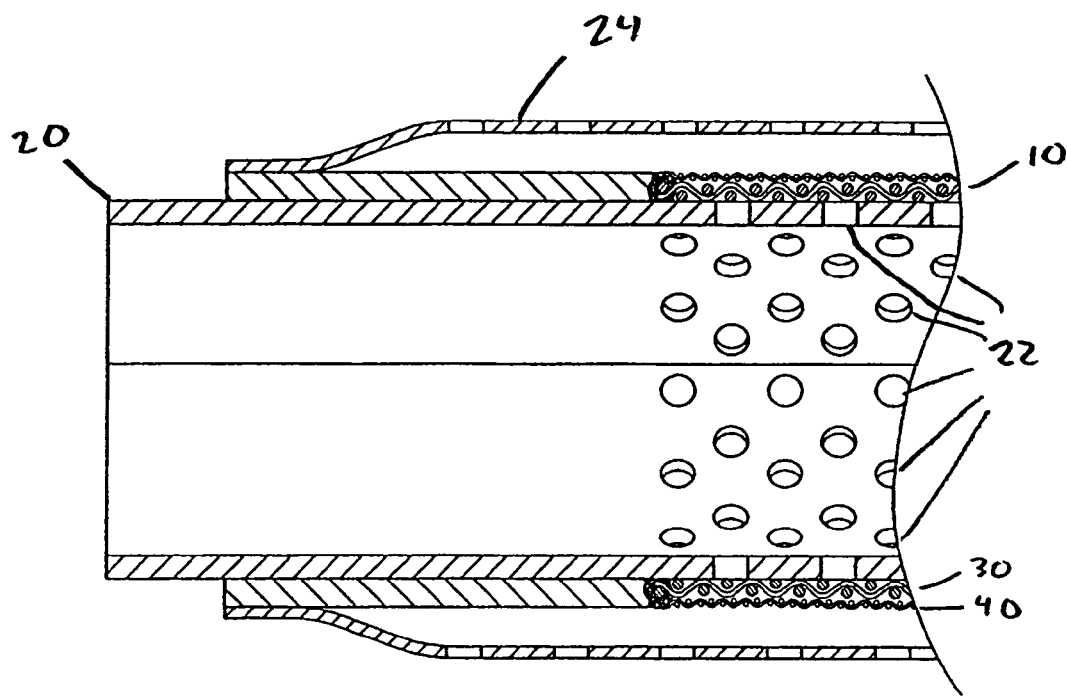
FIG. 1 is a cross sectional view showing an embodiment of a particle control screen assembly mounted on a base pipe.

The invention is described with reference to the drawings. The relationship and functioning of the various elements of this invention are better understood by the following detailed description. However, the embodiments of this invention as described below are by way of example only, and the invention is not limited to the embodiments illustrated in the drawings.

Referring to FIG. 1, an embodiment of a particle control screen assembly 10 is illustrated as being incorporated into a sand or other particle filter system. The particle control screen assembly 10 is mounted on a base pipe 20 that is disposed, for example, in a wellbore. To draw in petroleum or natural gas from the wellbore, a portion of the base pipe 20 is perforated with holes 22. To prevent sand and other particles from being drawn into the base pipe 20 through such holes 22, the perforated portion of the base pipe 20 is covered by the particle control screen assembly 10.

Figure 2:
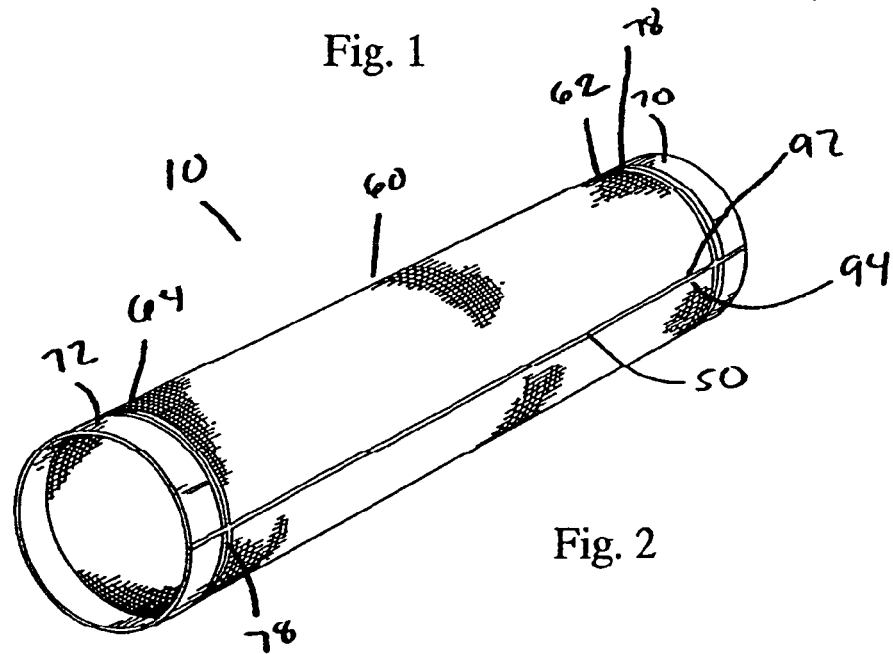
FIG. 2 shows an embodiment of a particle control screen assembly.

As shown in FIGS. 1 and 2, the particle control screen assembly 10 uses unsintered mesh layers 30, 40 and a longitudinal welded seam 50 to form a well screen that can endure well treatments and to form a positive barrier between the formation fluid and the inside of the base pipe 20. Because the particle control screen assembly does not use sintered or diffusion-bonded screens, it can be used with mesh materials that are unable to be sintered or diffusion bonded. In the embodiment illustrated in FIG. 1, the screen assembly is surrounded by a protective wrapper 24 that includes relatively thin metal plate material.

As shown in FIG. 2, the particle control screen assembly 10 includes a screen 60 having openings sized to prevent passage of particulate material. The screen 60 is typically cylindrically shaped to mate with a base pipe. The screen 60 includes a first end 62 and second end 64. The screen 60 includes a plurality of unsintered woven mesh layers. In one embodiment, the screen 60 includes two woven mesh layers 30, 40, as shown in FIG. 1. The layers may be designated as an inner layer 30 and an outer layer 40. In one embodiment, the inner layer 30 acts as a structural support and the outer layer 40 acts as a filter. The screen 60 may also include three or more woven mesh layers. Each woven mesh layer has a first longitudinal edge and a second longitudinal edge. The first and second longitudinal edges of the plurality of unsintered woven mesh layers are secured together by a longitudinal weld 50, with only the first 92 and second 94 longitudinal edges of the outer layer 40 shown.

To provide sufficient sand and particulate filtering in this application, the screen 60 is adapted for a perforated pipe used in a well. The woven mesh filter layer has a pore size to selectively prevent the inflow of certain sizes of particles through the basepipe. In one embodiment, the openings of the screen have a size between about 50 micron and about 500 micron. In another embodiment, the openings of the screen 60 have a size between about 50 micron and about 250 micron. In one embodiment, the openings are provided in the filter layer.

The screen 60 has a cross sectional thickness of between about 0.02 inch and about 0.3 inch, preferably between about 0.05 inch and about 0.15 inch, and most preferably between about 0.07 inch and 0.09 inch. In well applications, the screen 60 typically has an axial length of between about 3 feet and about 16 feet. In one embodiment, the screen 60 has an axial length of between about 45 inches and about 60 inches. It will be appreciated that actual size ranges can vary depending upon actual well requirements.

The particle control screen assembly includes at least one weld-compatible metal structure 70 disposed adjacent the first end 62 of the screen 60. The weld-compatible metal structure 70 is preferably cylindrical and provides a "safe edge" that protects the screen assembly at its end and that can in turn be welded to other structures or welded upon as desired without concern about burning the screen wires of the mesh layers. A circumferential metal weld 78 connects the screen 60 and the cylindrical metal structure 70, with the circumferential metal weld 78 bonding a portion of the metal structure and a portion of the screen 60. In one embodiment, the particle control screen assembly includes a second cylindrical weld-compatible metal structure 72 adjacent to the second end 64 of the screen 60.

Figure 3:
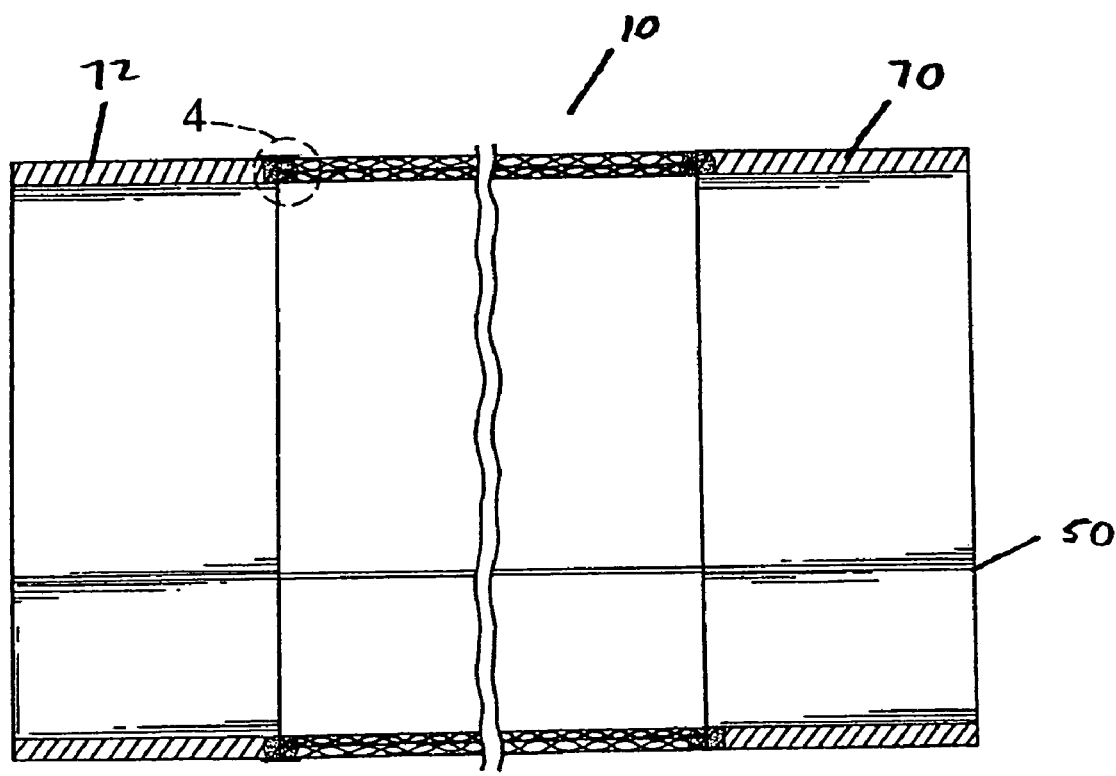
FIG. 3 is a cross sectional view of an embodiment of a particle control screen assembly.
Figure 5:
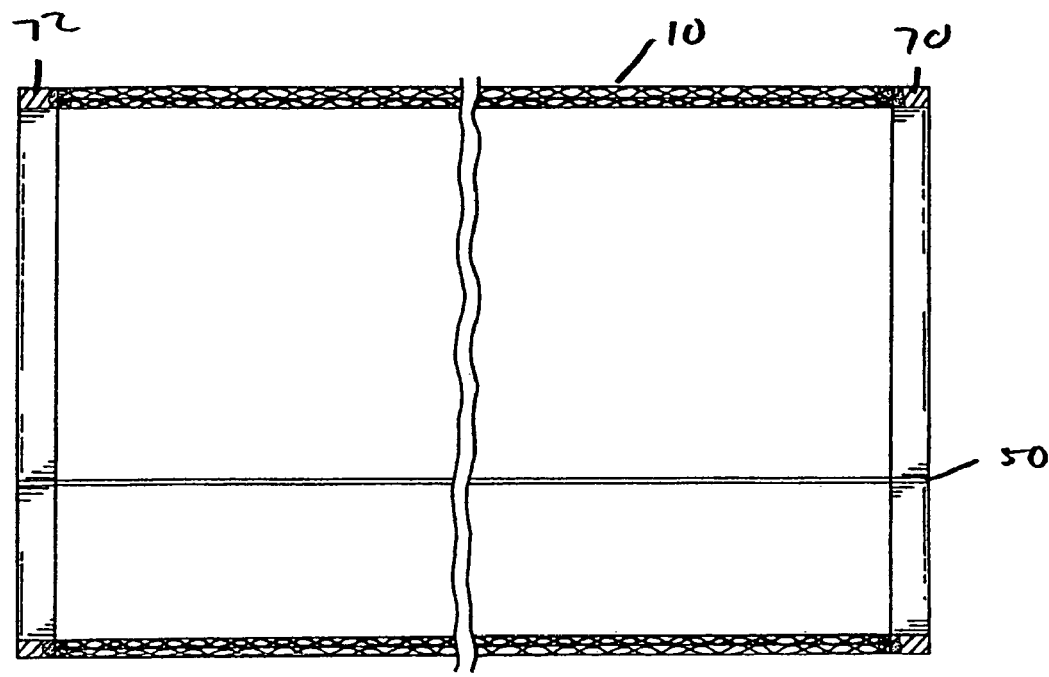
FIG. 5 is a cross sectional view of another embodiment of a particle control screen assembly
Figure 6:
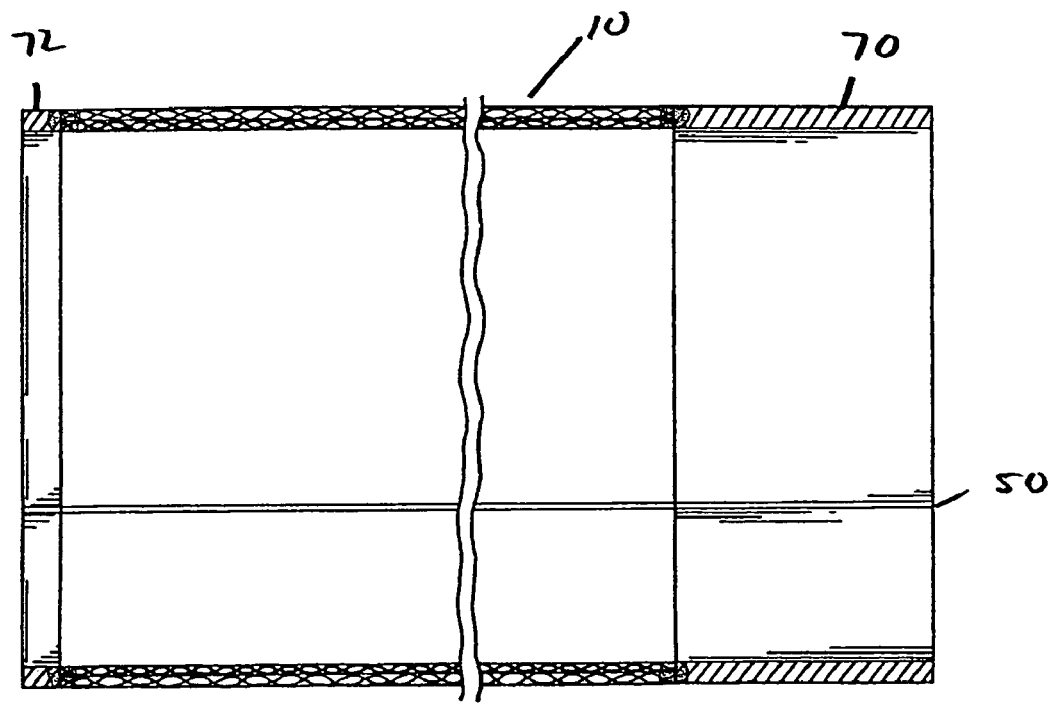
FIG. 6 is a cross sectional view of another embodiment of a particle control screen assembly.

In one embodiment, the cylindrical metal structure 70 has a radial thickness or cross sectional thickness of between about 0.02 inch and about 0.2 inch, preferably between about 0.04 inch and about 0.1 inch, and most preferably between about 0.05 inch and 0.08 inch In one embodiment, the cylindrical metal structure 70 has an axial length of between about 0.30 and about 5.0 inches. In one embodiment, the cylindrical metal structure 70 has an axial length of about 3.50 inches. In another embodiment, the cylindrical metal structure 70 has an axial length of about 0.50 inches. As shown in FIGS. 3, 5, and 6, each end of the particle control screen assembly may have either a shorter metal structure or a longer metal structure. The particle control screen assembly in FIG. 3 includes relatively longer cylindrical metal structures 70, 72, which in one embodiment is about 3.50 inches. The particle control screen assembly in FIG. 5 includes relatively shorter cylindrical metal structures 70, 72, which in one embodiment is about 0.50 inches. The particle control screen assembly in FIG. 6 includes a relatively longer cylindrical metal structure 70, and one relatively shorter cylindrical metal structure 72. Other lengths of metal structure may be used depending on the desired application.

Figure 4:
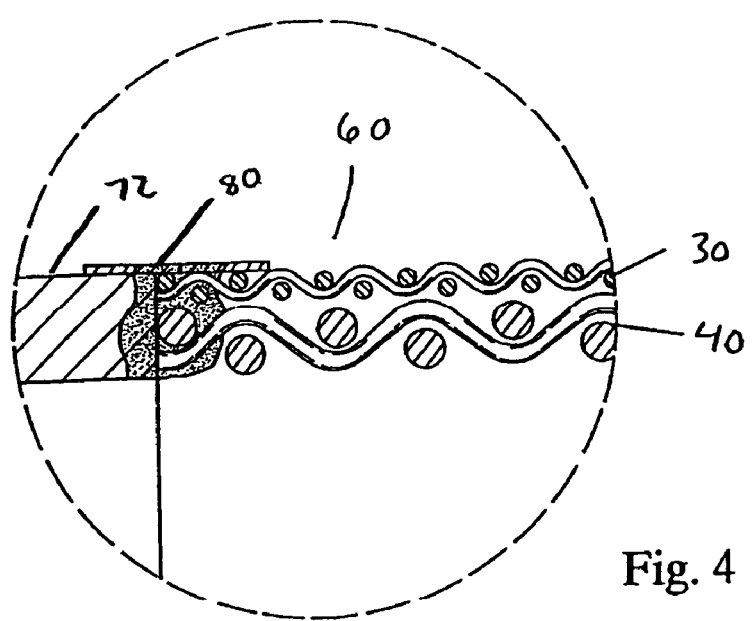
FIG. 4 is an enlarged view of FIG. 3 showing one embodiment of the connection between the cylindrical screen and the metal structure.

As shown in FIG. 4, in one embodiment, a sealing strip 80 is used at the weld 78 between the screen edge and the cylindrical metal structure 70 or 72. The use of the sealing strip 80 is disclosed in U.S. Pat. No. 6,514,408, entitled "Welded Particle Control Screen Assemblies," the contents of which are hereby incorporated by reference. The sealing strip 80 may take the form of a separate thin, solid metal strip. The sealing strip 80 is arranged along the edges of the mesh layers that are welded to the cylindrical metal structure 70. The sealing strip 80 is preferably disposed on the exterior portion of the particle control screen assembly, but may also be placed in the interior of the particle control screen assembly. In one embodiment, the sealing strip 80 is an imperforate annular sealing strip of a weld-compatible metal arranged along the first end of the screen 60. In one embodiment, the sealing strip 80 covers an axial length of the screen 60 greater than the maximum length of screen wire burn that is induced as a result of the welding process such that no holes or gaps larger than the effective pore size of the screen are formed. In one embodiment, the annular sealing strip 80 has an axial length of about 0.50 inches. It has been found that a sealing strip 80 having a thickness of about 0.005 inch and about 0.02 inch works sufficient for this application. In one embodiment, the sealing strip 80 comprises nickel foil. In one embodiment, the metal weld 78 between the screen 60 and the metal structure bonds to a portion of the annular sealing strip 80.

Turning now to a method of forming the particle control screen assembly, two or more layers of unsintered/non-diffusion bonded mesh 32, 42 are stacked, with the mesh sizes depending on the desired filtering qualities. The first 32 and second 42 mesh layers are positioned with respect to each other to form a two-layer unsintered screen, as shown in FIG. 7. As can be seen from the cutaway view in FIGS. 7 and 8, the mesh layer 42 forms a top layer and the mesh layer 32 forms a bottom layer. In one embodiment, the top layer 42 acts as a filter layer and the bottom layer 32 acts as a support layer. In one embodiment, the mesh layers 32, 34 are tacked together to hold them in place for the later fabrication steps. During tacking, the mesh layers may be pressed flat by a plate to prevent ripples from forming.

The two-layered unsintered screen has a first end 84, a second end 86, a first longitudinal edge 52, and a second longitudinal edge 54. Metal strips 74, 76 are attached to opposite ends of the two-layered unsintered screen, as shown in FIGS. 7 and 8. The metal strips 74, 76 can be of any suitable width, and can be of different widths. In one embodiment, an imperforate annular sealing strip 80 of a weld-compatible metal is attached along the first end 84 of the two-layered unsintered screen before attaching the metal strip 74 to the first end 84 of the two-layered unsintered screen 12. The metal strip 74 is welded to the two-layer unsintered screen, with the metal weld 78 bonding a portion of the metal strip 74, a portion of the mesh layers 32, 42, and a portion of the annular sealing strip 80 (if present). An imperforate annular sealing strip 80 of a weld-compatible metal may attached along the second end 86 of the two-layered unsintered screen before attaching the metal strip 76 to the second end 86 of the two-layered unsintered screen 12.

Figure 9:
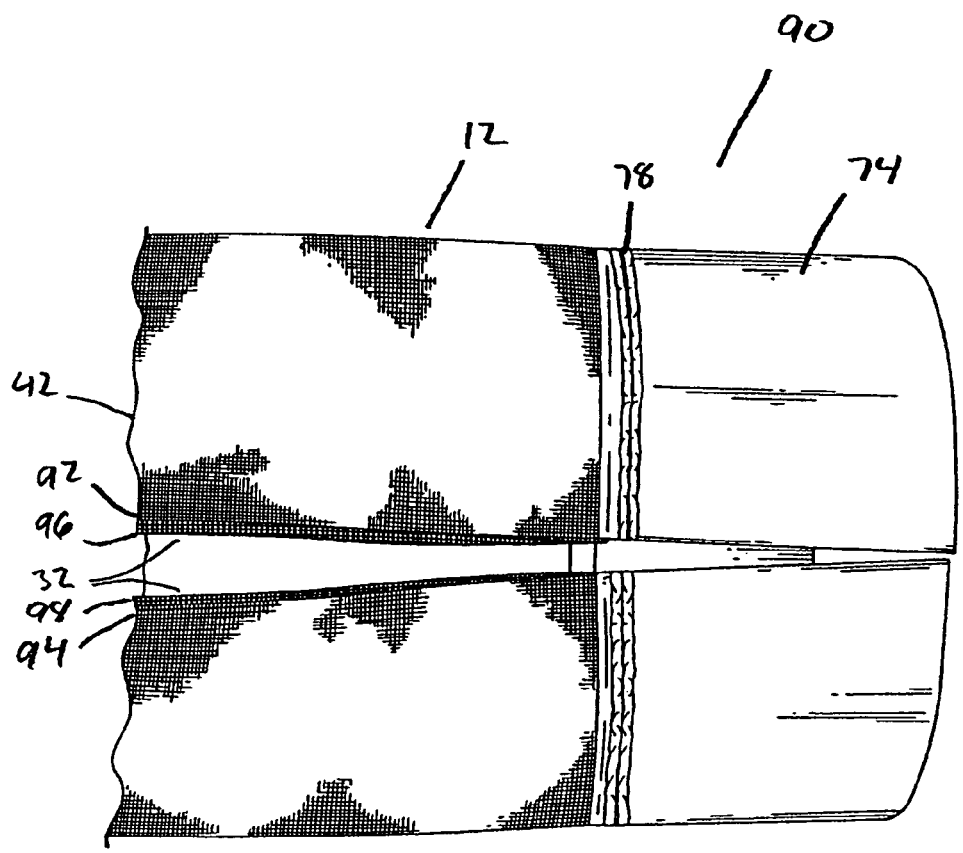
FIG. 9 shows an embodiment of a two-layer mesh screen formed into a generally cylindrical shape.

As shown in FIG. 9, the screen 12 and metal strips 74, 76 are then formed into a generally cylindrical shape 90, with mesh layer 32 having a first 96 and second 98 longitudinal edge and mesh layer 42 having a first 92 and second 94 longitudinal edge. Solid metal strips 74, 76 form circumferences at opposite ends of the tube.

The first 96 and second 98 longitudinal edges of layer 32 may extend beyond the edges 92 and 94 of layer 42 due to the forming process. If the edges of the two layers 32, 42 are not aligned, it is nearly impossible to perform a GTAW butt weld. Longitudinal edges 96, 98 and/or 92, 94 may be trimmed so that the longitudinal edges of each layer are generally coterminous. In one embodiment, a portion of each longitudinal edge of each screen layer 43, 42 is trimmed. A plasma cutting machine may be used to trim the longitudinal edges. The generally cylindrical shape 90 is placed in the plasma cutting machine and secured onto a mandrel. The mandrel is used to hold the generally cylindrical shape 90 securely and also provide a guide for the plasma cutting machine to trim the longitudinal edges. The mandrel includes a milled slot along its length. In one embodiment, the slot is about 0.5 inches wide. The plasma torch travels along the mandrel and trims the longitudinal edges of each layer 32, 42. Because the torch cuts along the milled slot in the mandrel, damage to the generally cylindrical shape 90 from slag and heat from the cutting operation is minimized. The trimming process makes possible the formation of a longitudinal weld of unsintered/non-diffusion bonded mesh layers.

The first and second longitudinal edges 92, 94, 96, 98 of the mesh layers are then welded together. A longitudinal seam weld 50 is made along the entire length of the tube, as shown in FIG. 2. Before making the longitudinal weld, each end 74, 76 may be tacked welded together at the longitudinal edge. The longitudinal weld 50 bonds the first and second longitudinal edges 92, 94, 96, 98 of the mesh layers. The resulting particle control screen assembly 10 is shown in FIG. 2.

The welding in each phase of assembly may be accomplished by any known method, including gas tungsten arc welding (GTAW), tungsten inert gas (TIG) welding, and plasma welding. The material of each weld is conventional and is selected such that it is compatible with the metal of the support tube (which in one embodiment is stainless steel) and the mesh layers (which in one embodiment is stainless steel). The particle control screen assembly may be made from 316L, Carpenter 20Cb3, Inconel 825, and other types of stainless steel. The metals of the cylindrical metal structure 70 and the screen 60 have a sufficiently similar melting point such that during the welding process the edge of the cylindrical metal structure 70 and the edge of the screen 60 melt and integrally bond with the weld such that the weld unitizes the screen with the cylindrical metal structure 70. Likewise, the sealing strip 80 also has a similar melting point such that the metal of the sealing strip 80 melts and integrally bonds with the weld.

The particle screen assembly 10 may be disposed onto a base pipe 20 with any number of wrapper configurations with circumferential welds being made at each end of the particle screen assembly 10 to form a complete well screen. The screen assembly can be assembled along the length of the base pipe in sections of a given length, for example, in four foot or nine foot sections, whereby each section is then secured to the base pipe such as being welded thereto. Furthermore, providing the screen assembly in sections provides greater structural support for the screen assembly. Typical lengths for a base pipe are 20, 30 or 40 feet, although shorter or longer lengths are of course possible. In one embodiment, multiple particle control screen assemblies are connected together a particle control assembly tube. In one embodiment, the cylindrical metal element at each end of the particle control assembly tube is about 3.5 inches long. This prevents heat-induced sensitization of the mesh (sensitized mesh can weaken and fail) when the particle screen assembly tube is welded to the base pipe. Thus, in one embodiment, a single assembly includes one tube with 3.5 inches of safe edge on each side, such as particle control assembly in FIG. 3. In another embodiment, a double particle control assembly tube includes two particle control assemblies as shown in FIG. 6, each with 3.5 inches of safe edge on one side and 0.5 inch on the other, which are connected at the 0.5 inch edge. Finally, a triple particle control assembly tube includes a center assembly with a 0.5 inch safe edge on each side (as shown in FIG. 5) and two outer assemblies with 3.5 inches on the outer end and 0.5 inch on the inner end.

The embodiments described above and shown herein are illustrative and not restrictive. The scope of the invention is indicated by the claims rather than by the foregoing description and attached drawings. The invention may be embodied in other specific forms without departing from the spirit of the invention.

What is claimed:

1. A particle control screen assembly for a perforated pipe used in a well, comprising:
    a screen comprising:
        a first end and a second end;
        a first and a second unsintered woven mesh layer, each layer having a first and a second longitudinal edge and having openings sized to prevent passage of particulate material; and
        a longitudinal metal weld adjacent each of the first and second longitudinal edges of the unsintered woven mesh layers to secure the edges together in a butt joint;
    a weld-compatible metal structure axially adjacent the first end of the screen; and
    a circumferential metal weld between the screen and the metal structure with the metal weld bonding a portion of the metal structure and a portion of the screen.

2. The particle control screen assembly of claim 1 wherein the screen is generally cylindrical and the first and second unsintered woven mesh layers comprise an inner support layer and an outer filter layer.

3. The particle control screen assembly of claim 2, further including an annular sealing strip, wherein the metal structure and the screen axially butt up against each other, and wherein the annular sealing strip is cylindrical and comprises a first portion covering the first end of the screen and a second portion covering an edge of the metal structure adjacent the screen.

4. The particle control screen assembly of claim 3 wherein the annular sealing strip has an axial length of about 0.50 inches.

5. The particle control screen assembly of claim 2 wherein the openings are disposed in the outer filter layer and are sized between about 50 micron and about 500 micron.

6. The particle control screen assembly of claim 2 wherein the openings are disposed in the outer filter layer and are sized between about 50 micron and about 250 micron.

7. The particle control screen assembly of claim 1 further comprising an imperforate annular sealing strip of a weld-compatible metal arranged along the first end of the screen.

8. The particle control screen assembly of claim 7 wherein the Circumferential metal weld between the screen and the metal structure bonds to a portion of the annular sealing strip.

9. The particle control screen assembly of claim 1 wherein the weld-compatible metal structure comprises a first weld-compatible metal structure and wherein the particle control screen assembly further comprises a second weld-compatible metal structure adjacent the second end of the screen.

10. The particle control screen assembly of claim 7 wherein the annular sealing strip has a thickness of between about 0.005 inch and 0.02 inch.

11. The particle control screen assembly of claim 1 wherein the screen further comprises a third unsintered woven mesh layer.

12. The particle control screen assembly of claim 1 wherein the particle control screen assembly has an axial length of between about 3 feet and about 10 feet.

13. The particle control screen assembly of claim 1 wherein the particle control screen assembly has a cross sectional thickness of between about 0.05 inch and about 0.1 inch.

14. The particle control screen assembly of claim 1 wherein the woven mesh layers comprise stainless steel.

15. The particle control screen assembly of claim 1 wherein the cylindrical weld-compatible metal structure has an axial length of about 3.50 inches.

16. The particle control screen assembly of claim 1 wherein the weld-compatible metal structure has an axial length of about 0.50 inches.

17. A particle control screen assembly for a perforated pipe used in a well, comprising:
- a cylindrical screen comprising:
  - a first end and a second end;
    - an inner unsintered woven mesh support layer having a first and second longitudinal edge;
    - an outer unsintered woven mesh filter layer having a first and second longitudinal edge;
  - openings sized to prevent passage of particulate material; and
  - a longitudinal metal weld adjacent the longitudinal edges of the inner unsintered woven mesh support layer and the outer unsintered woven mesh filter layer and securing the longitudinal edges together in a butt joint;
- a first and a second cylindrical weld-compatible metal structure axially adjacent the first and second end of the cylindrical screen, respectively;
- a first and a second imperforate annular sealing strip of a weld-compatible metal arranged along the first and second end of the cylindrical screen;
- a first circumferential metal weld between the first end of the cylindrical screen and the first cylindrical metal structure with the metal weld bonding a portion of the first cylindrical metal structure, a first portion of the metal particulate control screen, and a portion of the first annular sealing strip; and
- a second circumferential metal weld between the second end of the cylindrical screen and the second cylindrical metal structure with the metal weld bonding a portion of the second cylindrical metal structure, a second portion of the metal particulate control screen, and a portion of the second annular sealing strip.

18. The particle control screen assembly of claim 17 wherein each cylindrical weld-compatible metal structure has an axial length of between about 0.3 and about 4.0 inches.

19. The particle control screen assembly of claim 17 wherein each annular sealing strip has an axial length of about 0.50 inches.

20. The particle control screen assembly of claim 17 wherein the openings are sized between about 50 micron and about 250 micron.

21. A particle control screen assembly for a perforated pipe used in a well, comprising:
- a screen comprising:
  - a first end and a second end;
  - a first and a second unsintered woven mesh layer, each layer having a first and a second longitudinal edge and having openings sized to prevent passage of particulate material; and
  - a longitudinal metal weld adjacent each of the first and second longitudinal edges of the unsintered woven mesh layers to secure the edges together;
- a weld-compatible metal structure having a first end and a second end, one of the first and the second ends of the weld-compatible metal structure positioned axially adjacent to the first end of the screen; a circumferential metal weld between the first end of the screen and one of the first and second ends of the weld-compatible metal structure with the metal weld bonding a portion of the weld-compatible metal structure and a portion of the screen; and
- wherein the longitudinal weld extends over the weld-compatible metal structure.

22. The particle control screen assembly of claim 21, wherein the longitudinal weld secures a seam between opposing edges of the weld compatible structure together.

23. The particle control screen assembly of claim 22, wherein the longitudinal edges are arranged in abutting and generally non-overlapping relation.

* * * * *